US012737679B2

(12) United States Patent
Ahuja et al.

(10) Patent No.: US 12,737,679 B2
(45) Date of Patent: Sep. 15, 2026

(54) SYSTEM AND METHOD FOR ELECTRONIC COMPLIANCE EVALUATION OF TRANSMITTED OBJECT DATA VIA A MACHINE LEARNING MODEL

(71) Applicant: BANK OF AMERICA CORPORATION, Charlotte, NC (US)

(72) Inventors: Yogi Ahuja, Warwick, PA (US); Geetha Dwarakapuram, Newtown, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 828 days.

(21) Appl. No.: 18/093,459

(22) Filed: Jan. 5, 2023

(65) Prior Publication Data

US 2024/0232693 A1 Jul. 11, 2024

(51) Int. Cl.
*G06N 20/00* (2019.01)
*G06F 16/23* (2019.01)

(52) U.S. Cl.
CPC ......... *G06N 20/00* (2019.01); *G06F 16/2365* (2019.01)

(58) Field of Classification Search
CPC ............................ G06N 20/00; G06F 16/2365
See application file for complete search history.

(56) References Cited

U.S. PATENT DOCUMENTS 5,875,481 A 2/1999 Ashton et al.
6,003,089 A 12/1999 Shaffer et al.
6,044,445 A 3/2000 Tsuda et al.
6,349,351 B1 2/2002 Shimizu et al.
7,028,095 B1 4/2006 Foster et al.
7,631,140 B2 12/2009 Saito et al.
7,657,711 B2 2/2010 Okuno
8,014,287 B2 9/2011 Matsushita et al.
8,032,548 B2 10/2011 Susairaj et al.
8,270,379 B2 9/2012 Okamasu et al.
8,996,913 B2 3/2015 Harada et al.
9,848,432 B2 12/2017 Lee et al.
10,430,113 B2 10/2019 Ikarashi
10,455,260 B2 10/2019 Iguchi et al.
(Continued)

FOREIGN PATENT DOCUMENTS

JP 2006268274 A 10/2006

OTHER PUBLICATIONS

Related U.S. Appl. No. 18/093,456, filed Jan. 5, 2023, entitled "System and Method for Evaluating Compliance of Transmitted Object Data Via Data Efficiency Mapping".

*Primary Examiner* — Nhat Huy T Nguyen
(74) *Attorney, Agent, or Firm* — Moore & Van Allen PLLC; Nicholas C. Russell

(57) ABSTRACT

Systems, computer program products, and methods are described herein for electronic compliance evaluation of transmitted object data via a machine learning model. The system receives a request to transfer data from a first position to a second position, the data stored in a repository. The system then transmits the data from the repository to a field scanning utility, wherein the field scanning utility comprises a machine learning model, the machine learning model configured to identify and remove non-compliant objects from the data. Then system then transmits the non-compliant objects, using the field scanning utility, to a quarantine unit, and transmits the data to the second position.

14 Claims, 8 Drawing Sheets

(56) References Cited

U.S. PATENT DOCUMENTS

| | | | | |
|---|---|---|---|---|
| 10,783,116 | B2 | 9/2020 | Wong et al. | |
| 2002/0091749 | A1 | 7/2002 | Katayama | |
| 2007/0058548 | A1 * | 3/2007 | Babonneau | H04L 47/32 370/235.1 |
| 2011/0173400 | A1 | 7/2011 | Isono | |
| 2012/0124197 | A1 | 5/2012 | Ghai et al. | |
| 2013/0290523 | A1 | 10/2013 | Komatsuzaki et al. | |
| 2013/0339457 | A1 * | 12/2013 | Freire | G06Q 10/0635 709/204 |
| 2015/0271117 | A1 * | 9/2015 | Massand | G06F 3/0481 715/752 |
| 2020/0012794 | A1 * | 1/2020 | Saldanha | G06F 21/568 |
| 2020/0112525 | A1 | 4/2020 | Donley et al. | |

* cited by examiner

FORM AN ARRAY COMPRISING AT LEAST ONE BLOCK, EACH OF THE AT LEAST ONE BLOCK COMPRISING THE PROCESSING UNIT CHARACTERISTIC AND THE BYTE TRANSFER EFFICIENCY CORRESPONDING TO THE PROCESSING UNIT CHARACTERISTIC
402

ASSIGN A COMPLIANCE INDICATOR, INDIVIDUALLY, TO EACH OF THE AT LEAST ONE BLOCK, WHEREIN THE COMPLIANCE INDICATOR IS A BINARY OUTPUT CORRESPONDING TO A COMPARISON BETWEEN THE BYTE TRANSFER EFFICIENCY AND A TARGET BYTE TRANSFER EFFICIENCY, WHEREIN ACHIEVING THE TARGET BYTE TRANSFER EFFICIENCY INDICATES AN ADHERENCE TO REGULATIONS
404

DETERMINE A REGULATORY STATUS FOR THE ARRAY, WHEREIN THE REGULATORY STATUS COMPRISES A BINARY INDICATOR OF ADHERENCE TO A REGULATORY COMPLIANCE METRIC
406

EXPORT THE REGULATORY STATUS FOR THE ARRAY AS A REGULATORY STATUS RECORD
408

FIG. 4

SYSTEM AND METHOD FOR ELECTRONIC COMPLIANCE EVALUATION OF TRANSMITTED OBJECT DATA VIA A MACHINE LEARNING MODEL

FIELD OF THE INVENTION

The present invention embraces a system for electronic compliance evaluation of transmitted object data via a machine learning model.

BACKGROUND

Currently, entities strive to ensure that all objects communicated by the entity are inclusive of persons who suffer from visual impairment or are hard of hearing. Regulations exist to further ensure compliance with such inclusivity. Entities typically evaluate the compliance of objects with these regulations by manually predicting the compliance based on object file size or by performing laboratory simulations. Such techniques are prone to incorrect assumptions and are generally inaccurate as these techniques do not account for the multitude of situational factors pertaining to the efficiency and effectiveness of communications with endpoint devices and rendering of objects thereon. Accordingly, there may be scenarios where objects are rendered on endpoint devices in a manner which is not conducive to being seen or heard effectively by persons who suffer from visual impairment or are hard of hearing. As a result, the needs of the entity are unmet and thus results in a loss of productivity, added expenses, unexpected delays, or the like. As such, there is a need for a system and method for electronic compliance evaluation of transmitted object data via a machine learning model.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later. Embodiments of the invention are directed to a system, method, or computer program product for electronic compliance evaluation of transmitted object data via a machine learning model, the invention may include receiving a request to transfer data from a first position to a second position, the data stored in a repository, transmitting the data from the repository to a field scanning utility, wherein the field scanning utility includes a machine learning model, the machine learning model configured to identify and remove non-compliant objects from the data, transmitting the non-compliant objects, using the field scanning utility, to a quarantine unit, transmitting a notification to at least one endpoint device, the notification structured to receive an input from a user, the input comprising a disposition of the non-compliant objects, and transmitting the data to the second position.

In some embodiments, the machine learning model may be configured to receive at least one learning input selected from a group consisting of prohibited data, legal documentation, audit documentation, and regulatory status records.

In some embodiments, the regulatory status records may include a regulatory status for each object, wherein the regulatory status is coupled to corresponding objects, and wherein the regulatory status of each object has been determined by determining a processing unit characteristic for each at least one endpoint device, transmitting the object to the at least one endpoint device, each of the at least one endpoint device receiving the object, measuring a byte transfer efficiency of the transmission of the object to the at least one endpoint device using an application on the at least one endpoint device, transmitting the byte transfer efficiency to the first position, forming an array comprising at least one block, each of the at least one block comprising the processing unit characteristic and the byte transfer efficiency corresponding to the processing unit characteristic, assigning a compliance indicator, individually, to each of the at least one block, wherein the compliance indicator is a binary output corresponding to a comparison between the byte transfer efficiency and a target byte transfer efficiency, wherein achieving the target byte transfer efficiency indicates adhering to a regulation, and determining a regulatory status for the array, wherein the regulatory status comprises a binary indicator of adherence to a regulatory compliance metric.

In some embodiments, identifying and removing non-compliant objects from the data occurs at a regular interval, and wherein the data remains in the repository after the field scanning utility identifies and removes the non-compliant objects from the data.

In some embodiments, an output of the machine learning model is dynamically altered as a result of a change to a data input to the at least one learning input.

In some embodiments, the compliance indicator is either a positive compliance indicator or a negative compliance indicator, the positive compliance indicator indicating the at least one block adhering to the regulation and the negative compliance indicator indicating the at least one block not adhering to the regulation.

In some embodiments, the compliance indicator is determined by conditional formatting of the block, the conditional formatting of the block configured to automatically assign a positive compliance indicator or a negative compliance indicator based on at least one selected from a group consisting of: a mathematical difference between the processing unit characteristic and the target processing unit characteristic, and a mathematical difference between the byte transfer efficiency and the target byte transfer efficiency.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
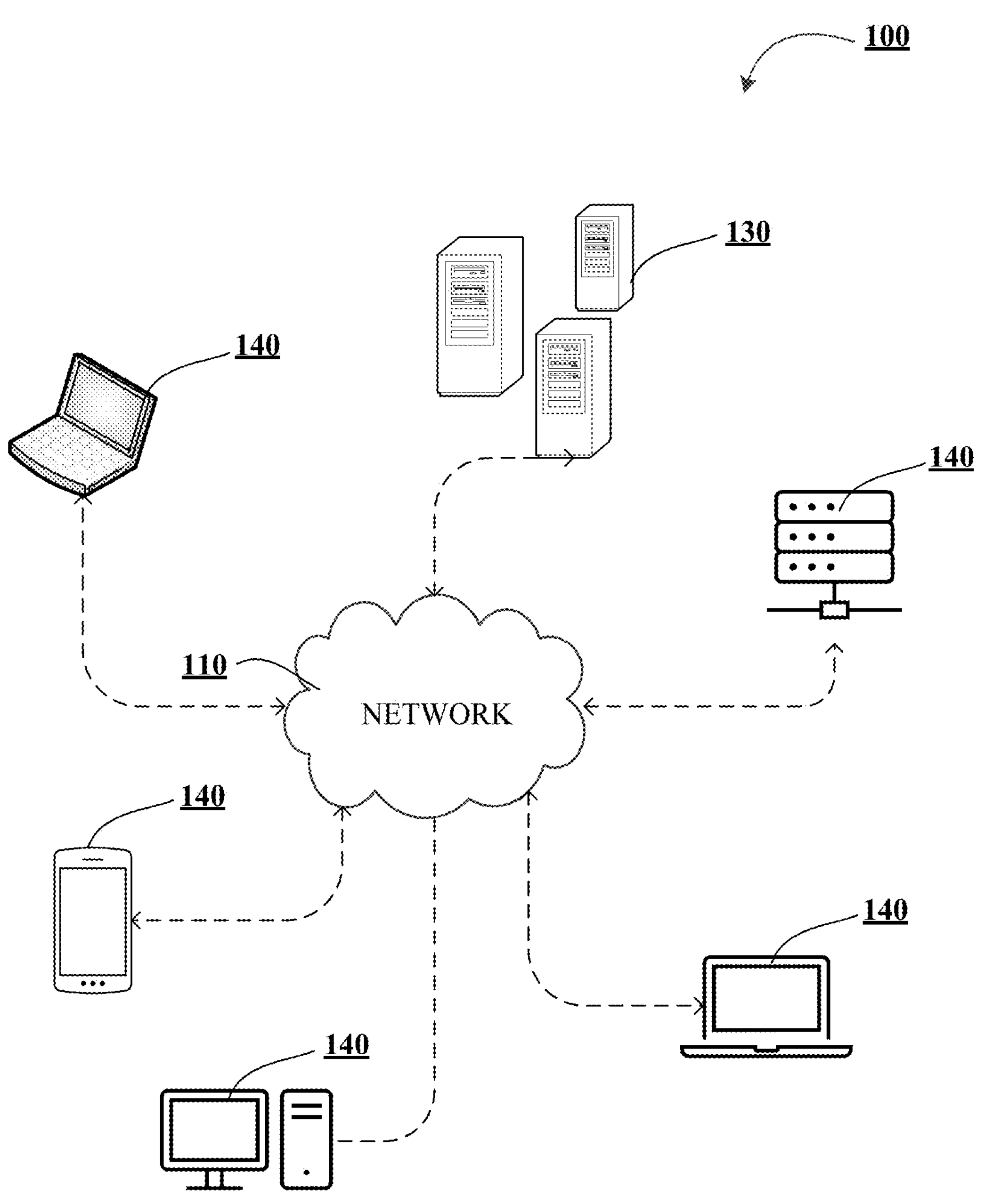
Figure 1B:
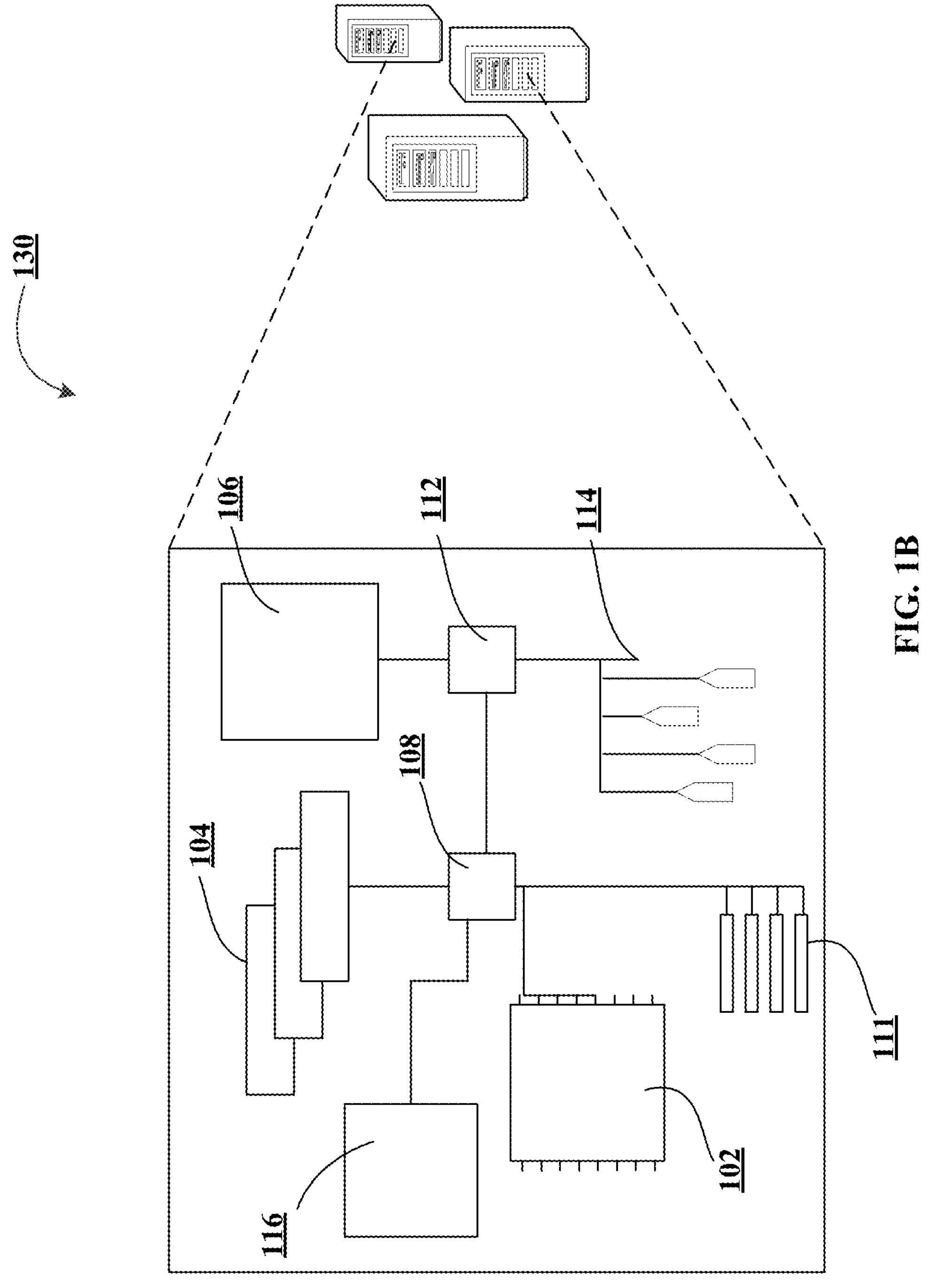
Figure 1C:
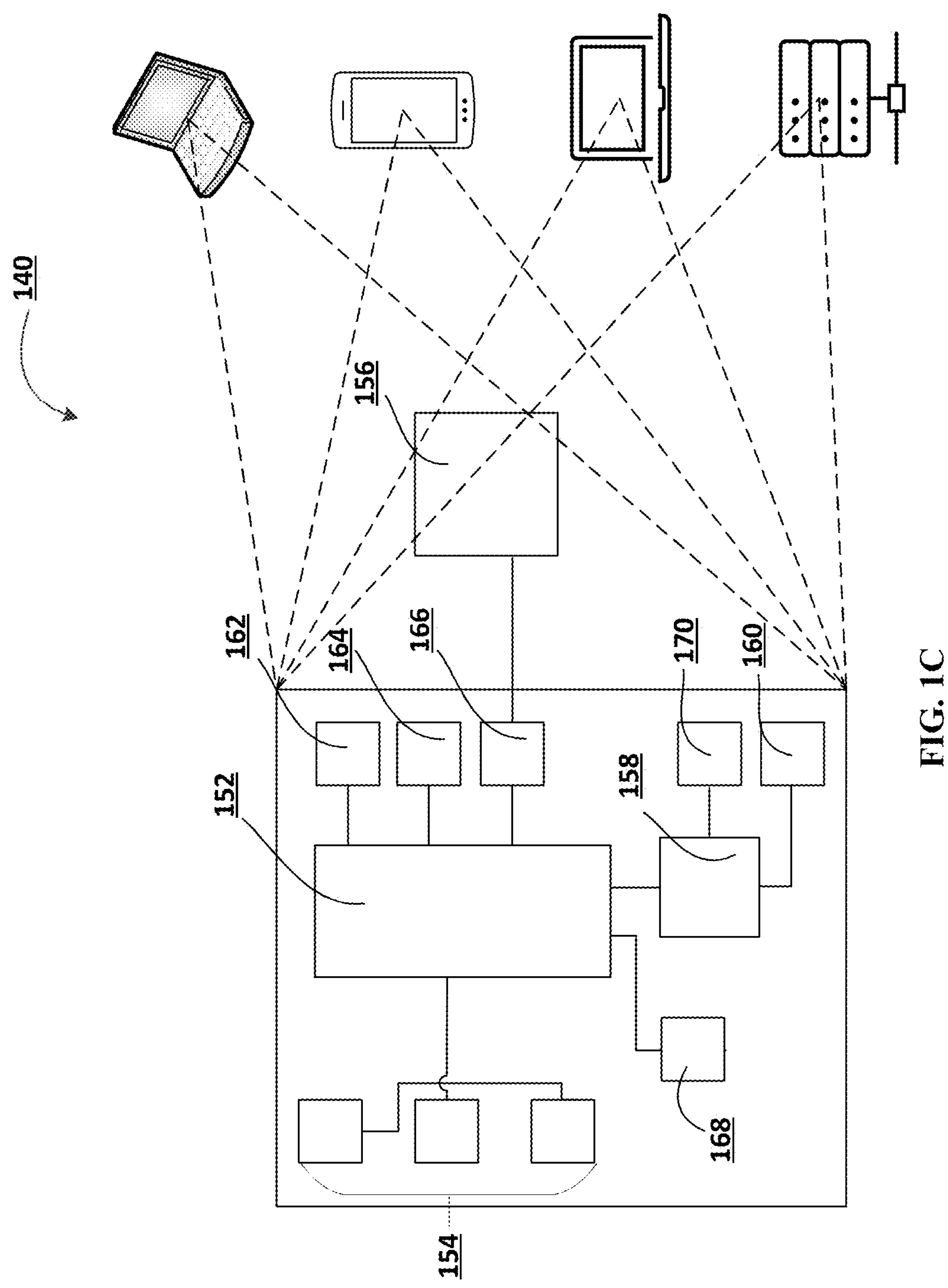
Figure 2:
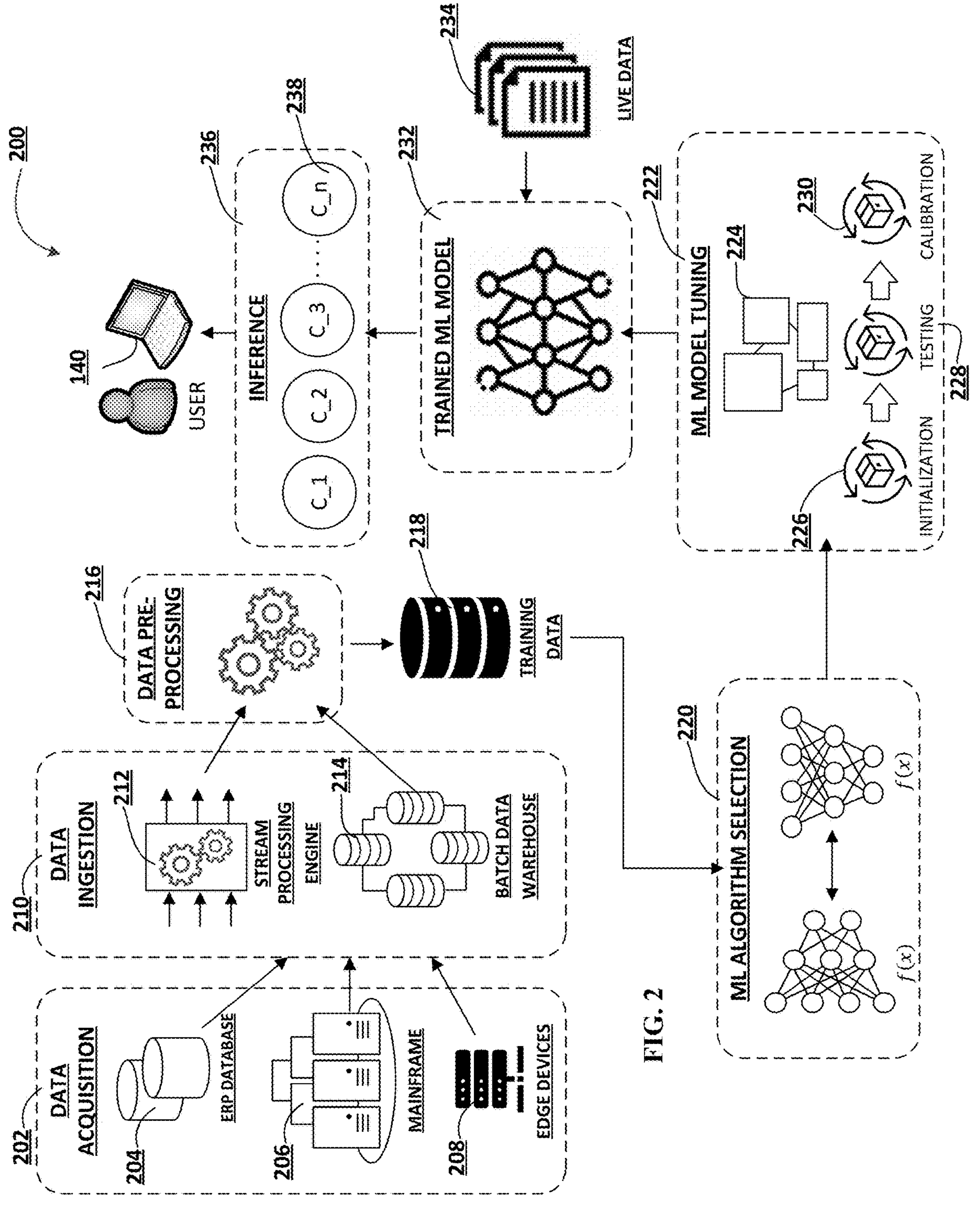
Figure 3:
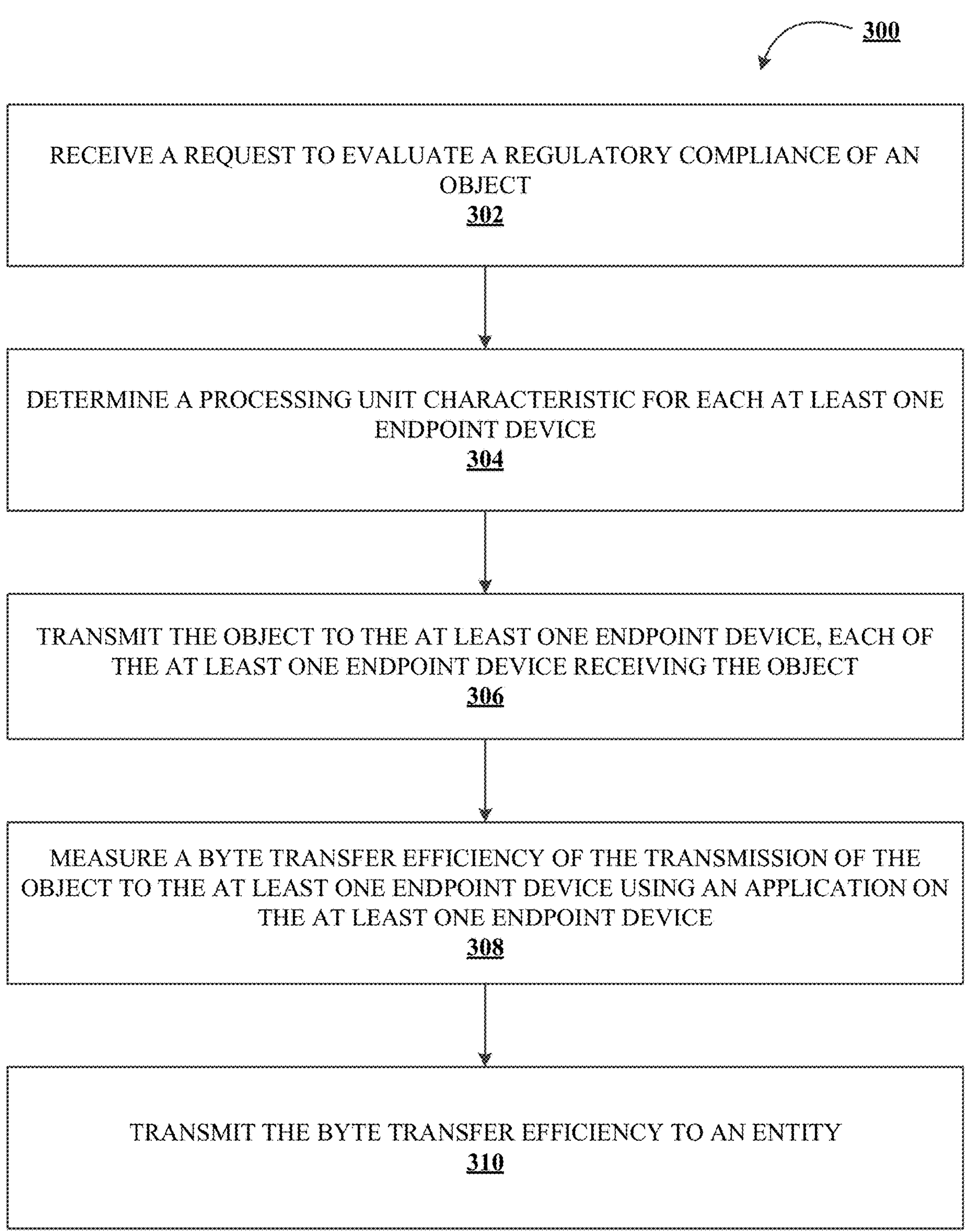
Figure 5:
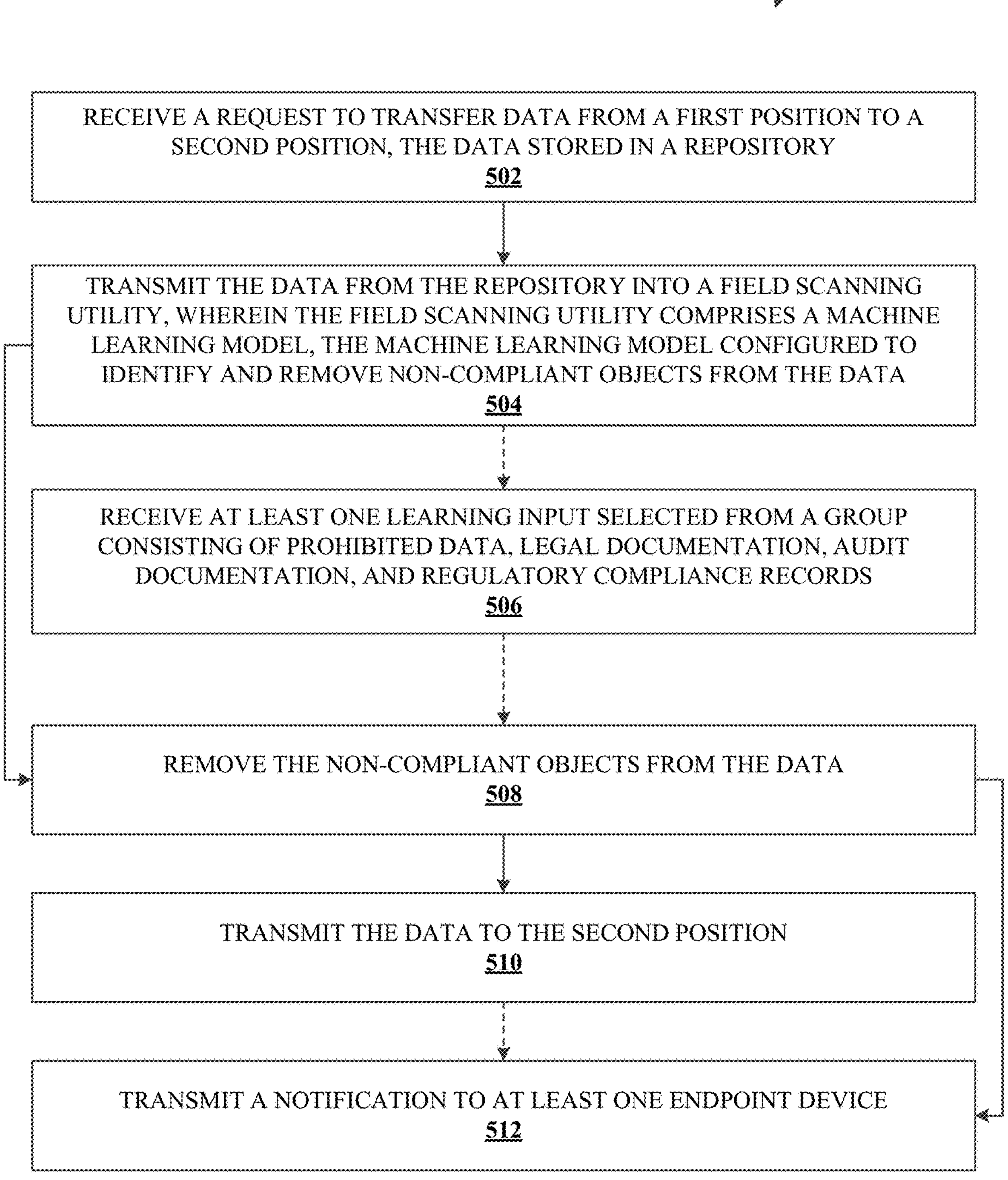
Figure 6:
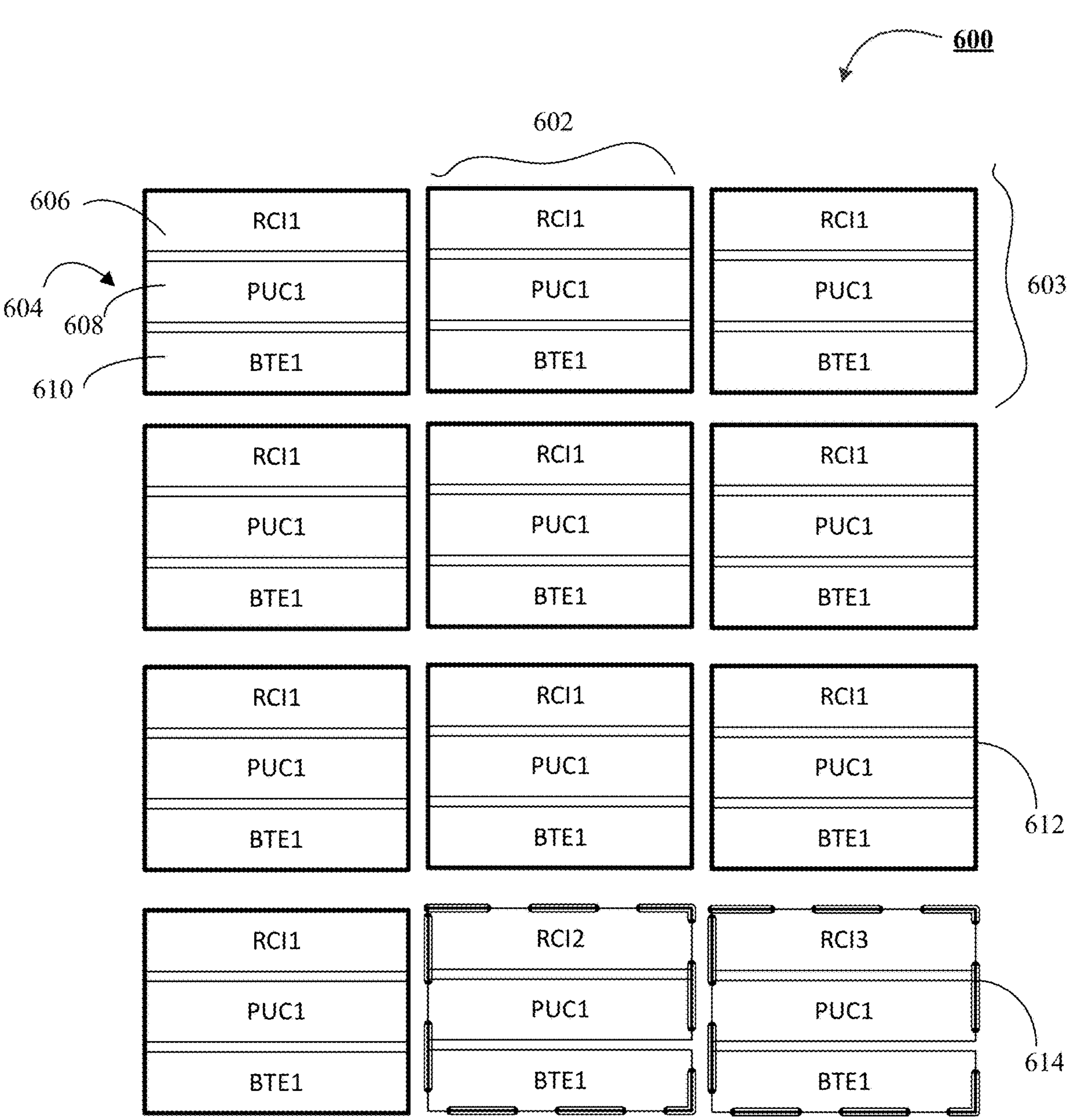

Having thus described embodiments of the invention in general terms, reference will now be made the accompanying drawings, wherein:

FIGS. 1A-1C illustrates technical components of an exemplary distributed computing environment for electronic compliance evaluation of transmitted object data via a machine learning model, in accordance with an embodiment of the invention;

FIG. 2 illustrates technical components of an exemplary machine learning (ML) subsystem architecture, in accordance with an embodiment of the invention;

FIG. 3 illustrates a process flow for evaluating compliance of transmitted object data via data efficiency mapping, in accordance with an embodiment of the invention;

FIG. 4 illustrates a process flow for evaluating compliance of transmitted object data via data efficiency mapping, in accordance with an embodiment of the invention;

FIG. 5 illustrates a process flow for electronic compliance evaluation of transmitted object data via a machine learning model, in accordance with an embodiment of the invention; and FIG. 6 illustrates an array of blocks for mapping data efficiency, in accordance with an embodiment of the invention

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data, such as electronic resource transfer or communication data. Typically, these data can be related to the customers of the entity, its products or services, the people who work for the organization, or any other aspect of the operations of the organization, such as communicative interactions between customers and people who work for the organization. As such, the entity may be any institution, group, association, financial institution, establishment, company, union, authority or the like, employing information technology resources for processing large amounts of data.

As described herein, a "user" may be an individual associated with an entity, or it may be a customer with a transactional relationship with the entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "object" may refer to a computer data file such as those for a graphical image (including, but not limited to, .jpg, .bmp, .tiff, .gif, and .raw) text (including, but not limited to, .txt,), animation (including, but not limited to, .jpg, .png, .svg, .gif, .mp4, dynamic HTML, Java, Flash), video (.mp4, .mpeg, .mov, .wmv, .avi, .flv), sound (including, but not limited to, .mp3, .mp4, .aac, .flac, .alac, .wav, .wma, .aac), or the like, which are configured to be reproduced for viewing on a user interface or listening on an endpoint device. An object may be viewed or listened to on endpoint devices through the use of various application programming interfaces ("APIs"), such that the object is transmitted to the endpoint device from a central location, such as a storage device (e.g., a "repository") of the entity system, via non-transitory wireless signal means such as Wi-Fi, Bluetooth, 3G, 4G, 5G or the like. The object may be displayed on the user interface may be integrated into applications, internet browsers, or other interfaces structured to transform the object data into visual images, video, animations, sound, etc.

As used herein, a "processing unit" may refer to a graphics processing unit ("GPU"), sound card, computer processor, or the like. A processing unit is a specialized electronic circuit designed to manipulate memory to accelerate the creation of images in a frame buffer intended for output to a display device. The processing unit may be used in embedded systems, mobile phones, personal computers, workstations, entertainment consoles, and so forth. Processing units are efficient at manipulating computer graphics, processing images, and/or processing or manipulating sounds. Their parallel structure makes them more efficient than general-purpose central processing units (CPUs) for algorithms that process large blocks of data in parallel. In an endpoint device, a processing unit can be present on a video card, sound card, or embedded on the motherboard.

It shall be appreciated that some processing units have characteristics which vary from other processing units, such that their ability to process data is more or less efficient than other processing units. Each processing unit will be defined by performance characteristics, such as bandwidth which is typically recorded in megabytes per second ("MB/s") or gigabytes per second ("GB/s"), which is a maximum value of the data size per second that the processing unit is capable of processing between the memory ("RAM") of the processing unit and the processing core of the processing unit. Accordingly, at any given moment during the processing of an object, the processing unit may reach the limit of the bandwidth available to process various objects. Various solutions to overcome a decrease in available bandwidth, e.g., computing power, such that images, text, and sound may be degraded in quality, compressed, or otherwise not rendered fully on the user interface of the endpoint device.

As used herein, a "byte transfer efficiency" may refer to the size of data packets per time interval at which data packets are able to be transferred to an endpoint device. For example, when an endpoint device has a weak or fluctuating signal connection with routing device or antenna, the number of data packets able to be transferred to the endpoint device over the internet is reduced. Accordingly, byte transfer efficiency may be calculated as a "speed" of upload and/or download, in units such as kilobytes per second ("KB/s") megabytes per second ("MBps"), gigabytes per second ("GB/s"), or the like. Similar to the processing unit, endpoint devices may contain various solutions to overcoming a decrease byte transfer efficiency, such that images, text, and sound may be degraded in quality, compressed, or otherwise not rendered fully on the user interface of the endpoint device As used herein, an "engine" may refer to core elements of an application, or part of an application that serves as a foundation for a larger piece of software and drives the functionality of the software. In some embodiments, an engine may be self-contained, but externally controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, an "endpoint device" may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

Prior to the invention described herein, entities frequently sent or transmitted objects to endpoint devices with little to no insight into the performance characteristics of the objects once they reach the endpoint device. Accordingly, it was frequent for objects to be displayed or reproduced on endpoint devices through user interfaces, speakers, or the like which did not meet certain accessibility regulation requirements, such as those set forth by the Americans with Disabilities Act ("ADA"). Such accessibility regulations prescribe features or characteristics of images, graphics, text, sound, etc. for reproduction on endpoint devices in order to assist those with visual or auditory disabilities/impairments in communicating with the endpoint device. For example, the images, graphics, text, etc. must be of a particular size and/or quality. Similarly, audio recordings must be of a particular decibel level and clarity. While some of these features required by the accessibility regulations may be tested for reproduction quality in a controlled environment, the numerous types of endpoint devices, endpoint device locations, connectivity constrains, computing/processing power and bandwidth make such testing challenging.

The invention disclosed herein provides for evaluating regulatory (e.g., accessibility) compliance of an object using data efficiency mapping. The system and method to accomplish such evaluation will analyze the processing unit of a given endpoint device, as well as analyze the byte transfer efficiency of any data being transmitted to the endpoint device. By analyzing at least these two parameters, the system will denote whether an object transmitted to such an endpoint device will be in compliance with the accessibility regulation. Based on this information, the entity may elect to restrict the transmission of such object until the object can be further optimized for compliance with the regulation. Accordingly, the invention is useful in preventing non-compliant objects from reaching merchants, vendors, or other third parties of the entity. Since information regarding the objects, various processing units, and byte transmission efficiencies are stored as compliance records as a result of this invention, the compliance records can be utilized in a machine learning model, along with various other records such as audit records, legal records, or the like, in order to continuously scan databases/repositories of data for any object which no longer is in compliance with the regulations.

Accordingly, the present invention is requested to evaluate the accessibility compliance of an object such as graphics, images, text, etc. An object is sent to one or more user devices with known processing characteristics, where while it is being sent to the user devices the byte transfer efficiency is measured and sent back to the entity. An array of blocks is formed, with each block having the processing unit characteristics, the byte transfer efficiency, and accessibility requirements listed. If a block in the array has byte transfer efficiency less than what is required for optimal reproduction of the object (e.g., the target transfer efficiency), the block is indicated as not meeting the accessibility regulation. Moreover, if an object is not capable of being reproduced at an optimal level according to the processing unit characteristics, the block is indicated as not meeting the accessibility regulation. If a block in the array has byte transfer efficiency greater than or equal to what is expected from the GPU the block is indicated as meeting the regulation. The array is evaluated for the number of blocks which meet the accessibility regulation, and if a certain percentage of blocks don't meet the regulation, the array is deemed not in compliance with the accessibility regulation. The array can serve as a regulatory status record for accessibility. The system may be further configured to scan data before sending or during the transmittal of data to vendors, merchants, or other third parties, such that the data which is sent is fully compliant with accessibility requirements, audit findings, legal precedent, etc. A machine learning engine is configured to receive as inputs the regulatory status record(s), audit record(s), legal document(s), and remove from the data anything that is not compliant.

What is more, the present invention provides a technical solution to a technical problem. As described herein, the technical problem includes the inability for entities to express consistent and accurate control over digital media objects which may not comply with accessibility regulations. Thus, manual testing of objects in various computing system simulations does not quickly of effectively capture the broad spectrum of real-world scenarios for endpoint devices in the field regarding processing unit power and/or byte transfer efficiency. The technical solution presented herein allows for consistent, accurate, and wide-range testing and documentation of object regulation compliance across a spectrum of real-word scenarios and endpoint devices. By doing so, the entity limits or eliminates the number of objects reaching users which do not comport with the regulation compliance requirements. In particular, the system is an improvement over existing compliance evaluation systems by evaluating compliance of objects (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment for electronic compliance evaluation of transmitted object data via a machine learning model 100, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

In some embodiments, the processor 102 may refer to a graphics processing unit ("GPU") that is specialized to optimally and efficiently create and display computer graphics and images in a frame buffer. The parallel structure of the GPU allows processing of large blocks of data more efficiently than a central processing unit ("CPU"). The GPU may be a dedicated graphics card, an external GPU ("eGPU"), a GPU integrated into a motherboard as part of a chipset, or a GPU on the same die as a CPU. In other embodiments, processor 102 may refer solely to a CPU, implemented on an integrated circuit microprocessor with one or more CPUs on a single integrated processor chip.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

In some embodiments, the processor 152 may refer to a graphics processing unit ("GPU") that is specialized to optimally and efficiently create and display computer graphics and images in a frame buffer. The parallel structure of the GPU allows processing of large blocks of data more efficiently than a central processing unit ("CPU"). The GPU may be a dedicated graphics card, an external GPU ("eGPU"), a GPU integrated into a motherboard as part of a chipset, or a GPU on the same die as a CPU. In other embodiments, processor 152 may refer solely to a CPU, implemented on an integrated circuit microprocessor with one or more CPUs on a single integrated processor chip.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for evaluating compliance of transmitted object data via data efficiency mapping, in accordance with an embodiment of the invention. The process begins at block 302, where the system receives a request to evaluate a regulatory compliance of an object. In some embodiments, the system may be presented with an object by a user associated with the entity (e.g., an employee) to evaluate the regulatory compliance of the object, such as through uploading or otherwise pointing the system to the file of an object. In other embodiments, the system may be configured to traverse one or more repositories (e.g., storage devices) such that each of the objects stored in the repositories may be subjected to the system for evaluation of regulatory compliance. In such embodiments, the system may incrementally choose one or more objects from the repository for evaluation, based on the alphabetical order of the filename(s), upload date/time into the repository, object filetype, object size, and so forth. In yet additional embodiments, the system may intercept object transfers (e.g., the communication of one or more objects from the entity to a third party) and subsequently subject the one or more objects to the process described herein for evaluation of regulatory compliance.

The process continues at block 304, wherein the system determines a processing unit characteristic for each at least one endpoint device. In some embodiments, users associated with the entity may be familiar with various endpoint devices, and accordingly, on an object-by-object basis, the user associated with the entity may note that certain processing unit characteristics are inadequate to properly render the object. For example, an object of relatively small size (for example, 12 megabytes in size) or without requirements for high end processing unit characteristics (for example, a text object with a simple font) may be known by a user associated with the entity to render effectively and within regulatory requirements for processing units with characteristics equal to or above certain criteria. Processing unit characteristics can be measured, and therefore evaluated, by clock speed, number of cores, bus bandwidth, or a "benchmark" number which aggregates true performance of the processing unit from in situ testing. As a non-limiting example, the user may know that one or more objects require a processing unit with at least 2 cores, therefore the one or more objects would be deemed as not compliant to regulations for any endpoint device with fewer than 2 cores.

Alternatively, in some embodiments, each of the one or more endpoint devices on a network may be configured with an application, script, internet browser plugin, or otherwise a form of software (such as CPU-Z or GPU-Z) configured to determine the endpoint device hardware information through the operating system of the endpoint device, and as such detects the central processing unit, RAM, motherboard chip-set, and other hardware features through querying the operating system such as Windows, MacOS, IOS, Android, Linux, or the like. The system may display the specifications of the processing unit(s) and its memory, and may also displays heat output, core frequency, memory frequency, GPU load and fan speeds. Accordingly, the system may determine the processing unit characteristics of one or more endpoint devices remotely, and in some embodiments determine the number of endpoint devices which are unable to render an object, doing so by sampling endpoint devices across the entity and determining through percentage calculation an estimated number of endpoint devices unable to render the object. In this way, if it is determined that a large percentage of endpoint devices are unable to render the object within regulatory requirements, the object may need further optimization (such as changes to the object, resolution changes, object complexity changes, compression, etc.) to utilize the object with such devices. Alternatively, the object may be labeled (as will be discussed in detail herein) as not being compliant with regulations. If a small number of endpoint devices have processing unit characteristics which are deemed inadequate, a decision may be made whether to modify the object to accommodate these endpoint devices, block the object from being sent to such devices, send an alternate object to such devices, and so forth.

As illustrated in block 306, in some embodiments the system transmits the object to the at least one endpoint device. The object, which is the subject of determining the regulatory compliance, is transmitted by the entity to the at least one endpoint device using the communication device. Accordingly, each of the at least one endpoint device receives the object, and the object may be at least temporarily stored in the storage device of the endpoint device. However, before the object is stored in the storage device of the endpoint device(s), the system may be configured to measure a byte transfer efficiency as illustrated in block 308.

The process continues at block 308 where the system measures a byte transfer efficiency of the transmission of the object to the at least one endpoint device using an application on the at least one endpoint device. As previously noted, each of the endpoint devices may be configured with an application which facilitates communication with the entity. Accordingly, the application detects a data transfer (e.g., transmission) of an object from an entity and records the upload and/or download speeds (byte transfer efficiency) of the transmission to the endpoint device. Alternatively, in some embodiments, the entity may monitor from the perspective of the entity system the upload or download speeds of an object to an endpoint device. In either embodiment, the duration required of the transfer is determined in common units such as Mbps (megabytes per second), Gb/s (gigabytes per seconds), or the like.

It is illustrated through testing that objects which are transmitted to endpoint devices which are incapable of receiving such transmissions at an acceptable pace are often reduced in quality or not rendered properly at the endpoint device. Accordingly, the rate at which the object is transmitted or transferred to the endpoint devices is a key indicator of the regulatory compliance of said object, since clarity of the rendering of the object is of utmost importance. By taking into consideration this byte transfer efficiency, an entity can properly determine if the resulting rendering of the object on the endpoint device is likely in compliance or not in compliance with the various regulations concerning visually and/or auditory impaired persons.

The process continues in block 310 in some embodiments by transmitting the byte transfer efficiency to the entity from the endpoint device(s). In some embodiments, the processing unit characteristic(s) may also be transferred to the entity from the endpoint device(s). It is well understood that the endpoint device(s) and the entity systems are operatively coupled, such that the communication interfaces of the endpoint device(s) and the entity system are in digital communication with one another. It also is noted that the entity may wish to organize and sort the data regarding byte transfer efficiency and/or processing unit characteristics into an array of blocks for each object, as will be described fully with respect to FIG. 4. In order to do so, the entity must receive the byte transfer efficiency from the endpoint device(s). It is noted that in embodiments where byte transfer efficiency is measured and recorded at the entity system instead of the endpoint devices, the process step in block 310 may not be necessary, or may be used only to transmit the processing unit characteristic(s) for the endpoint device(s) to the entity.

FIG. 4 illustrates a process flow 400 for evaluating compliance of transmitted object data via data efficiency mapping, in accordance with an embodiment of the invention. It shall be appreciated that users associated with the entity desire for a visual or graphical indicator that an object is or is not in compliance with regulatory requirements. Moreover, the users associated with the entity may further desire regulatory status records, such regulatory status records indicating which object(s) are or are not in compliance with regulatory requirements. The regulatory status records may indicate the filename, file path (e.g., the name of the file or directory, specifying a unique location in a file system), or the like. As will later be discussed in detail, the regulatory status records may be used as an input to a machine learning model to filter communications with third parties such that non-compliant objects will not be communication (e.g., transmitted or transferred).

Nonetheless, the process for generating the visual or graphical indicator that an object is or is not in compliance with regulatory requirement begins at block 402, where the system forms an array comprising at least one block, each of the at least one block comprising the processing unit characteristic and the byte transfer efficiency corresponding to the processing unit characteristic. “Block(s)” and “array(s)” typically correspond to “cell(s)” and “spreadsheet(s)”, respectively, as a manner to organize information pertaining to the object(s). However, it shall be appreciated that traditional spreadsheet layouts or file formats are not necessary to practice the invention described herein, as many other forms of data structuring and organization may be utilized. For example, instead of using a traditional spreadsheet, data may be organized and delineated in .txt, .csv, xml, .dif, or any number of commonly used data organization file types. Moreover, it shall be understood that a “block” may also refer to a plurality of adjacent sub-blocks, such that separate characteristics or attributes for an object may each be recorded (and thus stored) in corresponding sub-blocks for the object, with the block as a whole corresponding to an object’s regulatory status with respect to a specific combination of (i) at least one regulation (e.g., a regulatory compliance value), and/or (ii) a processing unit characteristic, and/or (iii) a byte transfer efficiency.

Now turning to FIG. 6, which illustrates an array of blocks 600 for mapping data efficiency, in accordance with an embodiment of the invention, we see individual blocks 604 may be arranged in rows 603 and columns 602 in a two-dimensional array (e.g., a matrix). It is important to note that the array of blocks 600 as illustrated in FIG. 6 may be displayed on a user interface. In this way, the blocks and underlying data are transformed from mere data in the system to a graphical representation of such. In some embodiments, only one row 603 and/or one column 602 may be utilized, such that the array is one-dimensional. Moreover, in some embodiments, inside each of the block 604 are values such as a regulatory compliance value 606, noted in FIG. 6 as “RCI”, a processing unit characteristic 608, noted in FIG. 6 as “PUC”, and a byte transfer efficiency 610, noted in FIG. 6 as “BTE”. It is noted that in FIG. 6 after each value 606, 608, and/or 610, a numerical character is inserted to represent a specific characterization of regulatory compliance value 606, processing unit characteristic 608, and/or byte transfer efficiency 610, such that values with the same numerical character are identical. These values can represent the minimum values of the requirement to meet regulatory standards, or in some embodiments the values may represent the actual calculated or retrieved value(s) as discussed with respect to FIGS. 3-4.

Compliance indicators 612, 614 are applied to each block 604, such as to indicate the specific combination of values 606, 608, and/or 610 does or does not allow for the object of which the array 600 is referring to comply with regulatory requirements. As one non-limiting example, a byte transfer efficiency 610 may be inadequate to render an object to the quality within regulatory requirements, and as such the block(s) 604 may be rendered in the array 600 with a positive compliance indicator 612. Positive compliance indicator 612 is illustrated in FIG. 6 as a solid outline on block 604, but it shall be appreciated that the system may use any number of visual indicators for the positive compliance indicator 612, such as a specific color for block 604, a specific outline, a text string or data string appended to the block 604, or the like. Similarly, a negative compliance indicator 614 is illustrated in FIG. 6 as a dotted outline on block 604, but it shall be appreciated that the system may use any number of visual indicators for the negative compliance indicator 614, such as a specific color for block 604, a specific outline, a text string or data string appended to the block 604, or any indicator different from that of the positive compliance indicator 612. In this way, it is clear to an observer, computer, or user which blocks in the array contain at least one value (e.g., metric) inadequate for proper rendering of the object. As will be discussed in relation to FIG.

4, the compliance indicators 612, 614 are determined as a binary matter, e.g., either the block 604 is adequate for regulatory requirements as a result of the values of the block 604 and the system returns a positive compliance indicator 612, or the block 604 is inadequate for regulatory requirements and the system returns a negative compliance indicator 614.

In some embodiments, the compliance indicators are entered manually as a result of scrutiny and technical knowledge of a user associated with the entity. In other embodiments, each block may be configured with conditional formatting, such that the block is pre-emptively programmed by a user to automatically display either a positive compliance indicator 612 or a negative compliance indicator 614 depending on the values 606, 608, 610 within each block 604. As one non-limiting example, if the byte transfer efficiency of a certain scenario (e.g., a real-world situation with retrieved or received values from an endpoint device) is less than 24 mbps, the block 604 may be configured to display the negative compliance indicator. As one of ordinary skill in the art would understand, similar conditional formatting may be used for any of the values 606, 608, 610.

Referring back to FIG. 4, and as previously described, the system at block 404 may assign a compliance indicator, individually, to each of the at least one block in the array. The compliance indicator is a binary output (e.g., a positive compliance indicator or a negative compliance indicator) which corresponds to a comparison between the byte transfer efficiency and a target byte transfer efficiency, wherein achieving the target byte transfer efficiency indicates adhering to a regulation. In other words, the system (through input by a user for conditional formatting of the block) receives a cutoff, of which the byte transfer efficiency is inadequate (e.g., below the cutoff indicated by the target byte transfer efficiency) for successfully rendering the object within regulatory compliance requirements.

The compliance indicator may also correspond to a comparison between a processing unit characteristic and a target processing unit characteristic, wherein an endpoint with a device processing unit characteristic (number of cores, computing speed, etc.) at least as high as the target processing unit characteristic indicates adhering to the regulation. In other words, the system (through input by a user for conditional formatting of the block) receives a cutoff, of which the processing unit characteristic is inadequate (e.g., below the cutoff indicated by the target processing unit characteristic) for successfully rendering the object within regulatory compliance requirements.

In some embodiments, there may be manual entry or overriding of the compliance indicator altogether, by a user.

The process continues in block 406, where the system determines a regulatory status for the array as a whole, using a regulatory status metric. Regulatory status may be determined through mathematical calculation of the percentage of blocks in the array which have a positive compliance indicator compared to the total number of blocks. For example, a regulatory requirement metric such as a percentage requirement may preemptively be determined by a user, entity, or regulatory authority, such that 80 percent (80%) of the blocks in the array must have a positive compliance indicator. In some embodiments, the regulatory compliance metric may be a minimum number of endpoint devices to which the object has been transmitted.

Since the array is related to a particular object (e.g., an image, video, sound, text, etc. which is being tested through the apparatus described herein), meeting the regulatory compliance metric for the array will lead to the system determining a binary indicator of adherence to a regulatory compliance metric, for example "yes" or "no", "compliant" or "non-compliant", "1" or "0", and the like. Thereafter, the regulatory status may be coupled to the object. The coupling of the object to the regulatory status in any traditional well-known data storage and/or manipulation technique is acceptable, such as adding tags to the object file, appending the filename with the regulatory status, or the like.

The process continues in block 408, wherein the system exports the regulatory status for the array as a regulatory status record. The regulatory status information of various objects is valuable information which is desired to be stored in a repository of the entity's systems. Accordingly, once the regulatory status for the array is determined and transmitted to a storage device such as a repository, the same data is known as a regulatory status record and may join other regulatory status records in the storage device for later reference, use, data manipulation, or the like, as will be discussed with respect to FIG. 5.

FIG. 5 illustrates a process flow 500 for electronic compliance evaluation of transmitted object data via a machine learning model, in accordance with an embodiment of the invention. It shall be appreciated that an entity may wish to restrict objects that are not in compliance with regulatory requirements leaving the possession of the entity. Since the regulatory status records have detailed information regarding the compliance of objects, these regulatory status records may be used to solve this common challenge using a technical solution. Moreover, the entity may have other records in other storage device(s) that may be used alongside the regulatory status records for filtering out (e.g., preventing the transmission of) objects that the entity wishes to retain privately and not transmit to third parties, endpoint devices, etc.

The process begins at block 502, wherein the system receives a request to transfer data from a first position to a second position, the data stored in a repository. The data which is requested to be transferred typically includes objects. As previously described, the repository may be a storage device of the system, memory device, and so forth. The first position may be the entity with a computer network on which the present system resides, while the second position may be a third-party such as a merchant, vendor, contractor, endpoint device, etc. The second position, as used in reference to FIG. 5, may also be a different folder within the same memory device, or a second memory device altogether within the same system, such that the first position and the second position are commonly owned, or even the same folder as the first position, and thus the system may be configured as an intra-entity data filtering system, where data not compliant with regulatory requirements is removed from a first position upon transferring to a second position. In such embodiments where intra-entity data filtering occurs, the field scanning utility, which will be fully described with respect to blocks 504 through 510, is executed at a regular interval, such as hourly, daily, weekly, monthly, quarterly, or the like. Entity systems constantly receive new data and data comprising objects, and as such it is beneficial for the process described herein to occur on a frequent basis in order to categorize this new or newly created data as being compliant or not compliant (e.g., non-compliant) with regulatory requirements.

As illustrated in block 504, the system transmits the data from the repository into a field scanning utility, wherein the field scanning utility comprises a machine learning model, the machine learning model configured to identify and remove non-compliant objects from the data. As previously described with respect to FIG. 2, a machine learning model may use various documents, data, etc. as inputs (e.g., training data) to the machine learning model, whereafter the machine learning model undergoes learning and filtering of such objects through supervised and/or unsupervised learning and content-based filtering techniques. Here, the machine learning model is utilized to predict, using categorization models, an object's regulatory status based on the inputs. As will be understood by one of ordinary skill in the art of machine learning, characteristics of objects such as object size, type, attributes, etc., may be paired with the output of the process described in FIG. 4, the regulatory status record, for the machine learning model to categorize and make predictions of the regulatory status of new objects with similar characteristics or attributes. The machine learning model may utilize clustering algorithms such as K-nearest neighbors or K-means to predict the regulatory status of any given data or object. Accordingly, those data or objects which have been identified to be non-compliant with regulatory requirements may be placed into a separate grouping (such as a different folder or storage device) than those which are compliant.

The process, in some embodiments, continues at block 506, where the machine learning model is configured to receive at least one learning input from prohibited data, legal documentation, audit documentation, and regulatory status records. Accordingly, the regulatory status records as have been discussed herein may not be the only input into the machine learning model. It is appreciated that an entity may also have a large volume of data in the form of legal documentation (such as active and archived litigation reports) which the machine learning model is capable of parsing for keywords and reference numerals to further identify through the clustering algorithm any data which contains reference to the legal documentation or shares enough keywords with the legal documentation that the first position wishes to refrain from transmitting to the second position.

Keywords are extracted from the prohibited data, legal documentation, and audit documentation by indexing and searching techniques well known by those of ordinary skill in the art of full-text searching. Here, the indexing portion of the code will scan the text of all the documents and build a list of search terms (e.g., an "index"). In the search stage, the system performs a search query of an array of various file type names, such as ".pdf", ".doc", ".docx", ".jpg", ".mov", etc. such that only the index is referenced during the query, rather than the text of the original documents. Once the query results in search results, and corresponding documents with those search results thereon, the system queries these documents for restricted keywords such as, but not limited to, "non-compliant", "out of compliance", "fail", "not compliant" or Boolean search terms thereof. The system may filter out the file type name search results based on a proximity to the restricted keywords, such as within 5 words, 10 words, 100 words, and so forth. Those file type name search results which are within the specified proximity are, for purposes of the invention, assumed to be referring to objects or data not in compliance. Accordingly, these filtered file type name search results are subsequently used as an input to the field scanning utility and/or machine learning model to quarantine those documents for later inspection by a user associated with the entity.

Similarly, audit documentation provided by audit personnel may identify data which is sensitive or known to be not in compliance with regulatory requirements, which the machine learning model is capable of parsing for keywords and reference numerals in the audit documentation to identify through the clustering algorithm any data which contains reference to the audit documentation or shares enough keywords with the audit documentation that the first position wishes to refrain from transmitting the data to the second position.

Moreover, the machine learning model may be trained to identify certain restricted keywords such as "ID", "SSN", "Address", "Date of Birth", etc. to identify via prediction the presence of prohibited data, such as identifying social security numbers, addresses, names, birthdates, photographs, or any other personally identifiable information that should be strictly restricted from transmitting from the first position to the second position.

Nonetheless, the regulatory status records will be used as an input into the machine learning model to analyze characteristics of objects such as object size, type, attributes, etc., and paired with regulatory status record, for the machine learning model to categorize and make predictions of the regulatory status of new objects with similar characteristics or attributes.

Accordingly, as is common with machine learning algorithms, the output of the machine learning model (e.g., the data with the non-compliant object removed therefrom) is dynamically altered as a result of a change to a data input to the at least one learning input. In other words, as the inputs to the machine learning model vary, such as the identification of regulatory status records, legal documentation, or the like which significantly vary from precedent, the machine learning model will amend or alter its categorization accordingly. For example, if a new object filetype is introduced which was previously unused or not discovered, yet requires a significant amount of byte transfer efficiency, an indication in the regulatory status records that such filetype is frequently not in compliance with regulatory requirements will teach the machine learning model to categorize any new objects of this filetype as non-compliant. In this way the field scanning utility (by utilizing the machine learning model along with the at least one learning input) removes the non-compliant objects from any data of which it is subjected to. Thereinafter, data (or objects) which pass through the field scanning utility receives a high degree of confidence from the entity that sensitive or non-compliant data therein is not transmitted and is instead quarantined.

The process continues at block 508, where the field scanning utility removes the non-compliant objects from the data. This removal may involve moving (e.g., transmitting) the object(s) to a different folder of a storage device, a different storage device, or leaving the non-compliant object(s) in their current location. Non-compliant objects or data may subsequently be quarantined (e.g., stored) in a storage device (e.g., a quarantine unit) for inspection at a later date by users associated with the entity, or in some embodiments by the field scanning utility itself. Non-compliant objects may also be marked, either with tags on the files or via appending characters to the filenames, such as to serve as a reminder of their status as non-compliant. This marking may be applied by the field scanning utility, prior or after the transmission of the non-compliant objects to the quarantine unit. The quarantine unit may be a portion of the entity system comprising the first position, but may also be an entirely different repository in said system. It shall be appreciated that hardware specifications such as processing unit characteristics will improve with technology over time, thus some previously non-compliant objects or data may become acceptable at a later date. Similarly, wireless communication technologies and areas of coverage thereof may also improve over time, leading to an increase in the byte transfer efficiencies of some endpoint devices. Thus, thus some previously non-compliant objects or data may become acceptable at a later date.

As shown in block 510, the field scanning utility then may transmit the data, now devoid of non-compliant object(s), to the second position. It shall be once again appreciated that the first position and second position may be common to a storage device, such that no movement outside the system may be necessary. In other embodiments, however, the data, now devoid of non-compliant object(s) may be transmitted to the second position where the second position merely receives the data outside the system (e.g., a third party).

Finally, as illustrated in block 512, the field scanning utility transmits a notification to at least one endpoint device. In some embodiments, the process step as illustrated by block 512 may be performed immediately following or during the field scanning utility removing the non-compliant objects from the data and/or into a quarantine unit. In other embodiments, the process step as illustrated by block 512 may be performed simultaneously with or after the field scanning utility then may transmit the data, now devoid of non-compliant object(s), to the second position. Nonetheless, one or more users who are responsible for the maintenance of the machine learning model may wish to receive a record via notification that the non-compliant object(s) have been removed, such as to approve or decline the removal of the non-compliant object(s) to the quarantining unit. A notification as provided may also permit such users to reconfigure the machine learning model via supervised learning, such that the machine learning model recognizes the parameters used to decide to remove the non-compliant object(s) (such as byte transfer efficiency and/or processing unit characteristic) are dissatisfactory to the user for future implementations of the machine learning model.

Accordingly, the notification may be presented on a graphical user interface of an endpoint device of a user, and depict details regarding the object such as filename, file size, and/or object location, as well as byte transfer efficiency, and/or processing unit characteristics which led the machine learning model to characterize the object(s) as a non-compliant object(s). The notification may also comprise an approval and/or rejection button, the approval button proceeding with the processing of the non-compliant object(s) to the quarantine unit, while the rejection button. In embodiments where the notification is transmitted to the endpoint device after the execution of the machine learning model, the field scanning utility may transmit the object(s) formerly classified as non-compliant object(s) to the second position. In embodiments where the notification is transmitted to the endpoint device during the execution of the machine learning model, the machine learning model may pause the processing of objects in the data until an appropriate disposition is provided to the user interface by a user on an endpoint device, such as "approve," or "reject."

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Pat. Application Ser. No. | Title | Filed On |
|---|---|---|---|
| 14133US1.014033.4514 | 18,093,456 | SYSTEM AND METHOD FOR EVALUATING COMPLIANCE OF TRANSMITTED OBJECT DATA VIA DATA EFFICIENCY MAPPING | Jan. 5, 2023 |

What is claimed is:

1. A system for electronic compliance evaluation of transmitted object data via a machine learning model, the system comprising:

at least one non-transitory storage device; and at least one processor coupled to the at least one non-transitory storage device, wherein the at least one processor is configured to:

receive a request to transfer data from a first position to a second position, the data stored in a repository;

transmit the data from the repository to a field scanning utility, wherein the field scanning utility comprises a machine learning model, the machine learning model configured to identify and remove non-compliant objects from the data, wherein the machine learning model is configured to receive regulatory status records, the regulatory status records comprising a regulatory status for each object coupled to corresponding objects, and wherein the regulatory status of each object has been determined by:

determining a processing unit characteristic for each at least one endpoint device:

transmitting the object to the at least one endpoint device, each of the at least one endpoint device receiving the object;

measuring a byte transfer efficiency of the transmission of the object to the at least one endpoint device using an application on the at least one endpoint device, wherein the byte transfer efficiency is measured for adequacy of object rendering according to a regulatory requirement for visually and/or auditory impaired persons;

transmitting the byte transfer efficiency to the first position;

forming an array comprising at least one block, each of the at least one block comprising the processing unit characteristic and the byte transfer efficiency corresponding to the processing unit characteristic;

assigning a compliance indicator, individually, to each of the at least one block, wherein the compliance indicator is a binary output corresponding to a comparison between the byte transfer efficiency and a target byte transfer efficiency, wherein achieving the target byte transfer efficiency indicates adhering to a regulation; and determining a regulatory status for the array, wherein the regulatory status comprises a binary indicator of adherence to a regulatory compliance metric based on whether a predefined percentage of blocks in the array satisfy the target byte transfer efficiency;

transmit the non-compliant objects, using the field scanning utility, to a quarantine unit;

transmit a notification to at least one endpoint device, the notification structured to receive an input from a user, the input comprising a disposition of the non-compliant objects; and transmit the data to the second position.

2. The system of claim 1, wherein identifying and removing non-compliant objects from the data occurs at a regular interval, and wherein the data remains in the repository after the field scanning utility identifies and removes the non-compliant objects from the data.

3. The system of claim 1, wherein an output of the machine learning model is dynamically altered as a result of a change to a data input to the at least one learning input.

4. The system of claim 1, wherein the compliance indicator is either a positive compliance indicator or a negative compliance indicator, the positive compliance indicator indicating the at least one block adhering to the regulation and the negative compliance indicator indicating the at least one block not adhering to the regulation.

5. The system of claim 1, wherein the compliance indicator is determined by conditional formatting of the block, the conditional formatting of the block configured to automatically assign a positive compliance indicator or a negative compliance indicator based on at least one selected from a group consisting of: a mathematical difference between the processing unit characteristic and the target processing unit characteristic, and a mathematical difference between the byte transfer efficiency and the target byte transfer efficiency.

6. A computer program product for electronic compliance evaluation of transmitted object data via a machine learning model, the computer program product comprising a non-transitory computer-readable medium comprising code causing an apparatus to:

receive a request to transfer data from a first position to a second position, the data stored in a repository;

transmit the data from the repository to a field scanning utility, wherein the field scanning utility comprises a machine learning model, the machine learning model configured to identify and remove non-compliant objects from the data, wherein the machine learning model is configured to receive regulatory status records, the regulatory status records comprising a regulatory status for each object coupled to corresponding objects, and wherein the regulatory status of each object has been determined by:

determining a processing unit characteristic for each at least one endpoint device;

transmitting the object to the at least one endpoint device, each of the at least one endpoint device receiving the object;

measuring a byte transfer efficiency of the transmission of the object to the at least one endpoint device using an application on the at least one endpoint device wherein the byte transfer efficiency is measured for adequacy of object rendering according to a regulatory requirement for visually and/or auditory impaired persons;

transmitting the byte transfer efficiency to the first position;

forming an array comprising at least one block, each of the at least one block comprising the processing unit characteristic and the byte transfer efficiency corresponding to the processing unit characteristic;

assigning a compliance indicator, individually, to each of the at least one block, wherein the compliance indicator is a binary output corresponding to a comparison between the byte transfer efficiency and a target byte transfer efficiency, wherein achieving the target byte transfer efficiency indicates adhering to a regulation; and determining a regulatory status for the array, wherein the regulatory status comprises a binary indicator of adherence to a regulatory compliance metric based on whether a predefined percentage of blocks in the array satisfy the target byte transfer efficiency;

transmit the non-compliant objects, using the field scanning utility, to a quarantine unit;

transmit a notification to at least one endpoint device, the notification structured to receive an input from a user, the input comprising a disposition of the non-compliant objects; and transmit the data to the second position.

7. The computer program product of claim 6, wherein identifying and removing non-compliant objects from the data occurs at a regular interval, and wherein the data remains in the repository after the field scanning utility identifies and removes the non-compliant objects from the data.

8. The computer program product of claim 6, wherein an output of the machine learning model is dynamically altered as a result of a change to a data input to the at least one learning input.

9. The computer program product of claim 6, wherein the compliance indicator is either a positive compliance indicator or a negative compliance indicator, the positive compliance indicator indicating the at least one block adhering to the regulation and the negative compliance indicator indicating the at least one block not adhering to the regulation.

10. The computer program product of claim 6, wherein the compliance indicator is determined by conditional formatting of the block, the conditional formatting of the block configured to automatically assign a positive compliance indicator or a negative compliance indicator based on at least one selected from a group consisting of: a mathematical difference between the processing unit characteristic and the target processing unit characteristic, and a mathematical difference between the byte transfer efficiency and the target byte transfer efficiency.

11. A method for electronic compliance evaluation of transmitted object data via a machine learning model, the method comprising:

receiving a request to transfer data from a first position to a second position, the data stored in a repository;

transmitting the data from the repository to a field scanning utility, wherein the field scanning utility comprises a machine learning model, the machine learning model configured to identify and remove non-compliant objects from the data, wherein the machine learning model is configured to receive regulatory status records, the regulatory status records comprising a regulatory status for each object coupled to corresponding objects, and wherein the regulatory status of each object has been determined by:

determining a processing unit characteristic for each at least one endpoint device;

transmitting the object to the at least one endpoint device, each of the at least one endpoint device receiving the object;

measuring a byte transfer efficiency of the transmission of the object to the at least one endpoint device using an application on the at least one endpoint device, wherein the byte transfer efficiency is measured for adequacy of object rendering according to a regulatory requirement for visually and/or auditory impaired persons;

transmitting the byte transfer efficiency to the first position;

forming an array comprising at least one block, each of the at least one block comprising the processing unit characteristic and the byte transfer efficiency corresponding to the processing unit characteristic;

assigning a compliance indicator, individually, to each of the at least one block, wherein the compliance indicator is a binary output corresponding to a comparison between the byte transfer efficiency and a target byte transfer efficiency, wherein achieving the target byte transfer efficiency indicates adhering to a regulation; and determining a regulatory status for the array, wherein the regulatory status comprises a binary indicator of adherence to a regulatory compliance metric based on whether a predefined percentage of blocks in the array satisfy the target byte transfer efficiency;

transmitting the non-compliant objects, using the field scanning utility, to a quarantine unit;

transmit a notification to at least one endpoint device, the notification structured to receive an input from a user, the input comprising a disposition of the non-compliant objects; and transmitting the data to the second position.

12. The method of claim 11, wherein identifying and removing non-compliant objects from the data occurs at a regular interval, and wherein the data remains in the repository after the field scanning utility identifies and removes the non-compliant objects from the data.

13. The method of claim 11, wherein the compliance indicator is either a positive compliance indicator or a negative compliance indicator, the positive compliance indicator indicating the at least one block adhering to the regulation and the negative compliance indicator indicating the at least one block not adhering to the regulation.

14. The method of claim 11, wherein the compliance indicator is determined by conditional formatting of the block, the conditional formatting of the block configured to automatically assign a positive compliance indicator or a negative compliance indicator based on at least one selected from a group consisting of: a mathematical difference between the processing unit characteristic and the target processing unit characteristic, and a mathematical difference between the byte transfer efficiency and the target byte transfer efficiency.

* * * * *